US005536384A

United States Patent [19]
Thompson et al.

[11] Patent Number: 5,536,384
[45] Date of Patent: Jul. 16, 1996

[54] SEPARATION OF SULPHIDES FROM PULPING LIQUORS BY ELECTRODIALYSIS

[75] Inventors: Rokhsareh Thompson, Pointe Claire; Michael Paleologou, Pierrefonds; Richard M. Berry, Ile Perrot, all of Canada

[73] Assignee: Pulp and Paper Research Institute of Canada, Pointe Claire, Canada

[21] Appl. No.: 388,378

[22] Filed: Feb. 14, 1995

[51] Int. Cl.[6] .................................................. B01D 61/44
[52] U.S. Cl. ........................ 204/522; 204/523; 204/525; 204/539
[58] Field of Search ........................... 204/182.4, 182.5, 204/301, 522, 523, 525, 539

[56] References Cited

U.S. PATENT DOCUMENTS

| | | | |
|---|---|---|---|
| 3,933,610 | 1/1976 | Ehara et al. | 204/182.5 |
| 4,207,157 | 6/1980 | Hirai et al. | 204/180 P |
| 4,325,792 | 4/1982 | Vaughan | 204/151 |
| 4,715,939 | 12/1987 | Ball et al. | 204/182.4 |
| 4,717,450 | 1/1988 | Shaw et al. | 162/29 |
| 5,082,526 | 1/1992 | Dorris | 162/30.11 |
| 5,110,432 | 5/1992 | Boateng | 204/182.3 |
| 5,292,407 | 3/1994 | Roy et al. | 204/101 |
| 5,324,403 | 6/1994 | Kennedy et al. | 204/182.4 |

FOREIGN PATENT DOCUMENTS

WO92/20856  11/1992  WIPO .

OTHER PUBLICATIONS

Chemical Abstracts vol. 74, 1971, Item 57156n. (no month).
MCC–Modified continuous kraft pulping–now a reality (B. Johansson et al., Svenski Papperstidning nr 10, 30–35 1984). no month.
EMCC–Extended delignification with a prolonged mild counter–current cooking stage. (J. E. Jiang et al. APPITA, 45 (1), 19, 1992) no month.
Modified kraft processes for softwood bleached–grade pulp. (S. Norden and A. Teder, TAPPI, 62(7), 49–51, Jul. 1979.
Extended delignification by combination of modified kraft pulping & oxygen bleaching. (A. Teder & L. Olm, Paperi ja Puu 63(4a), 315–322, 1981 no month.
Improved modified kraft cooking PartI. Pretreatment with a sodium sulfide solution. B. Mao et al. 1992, Paperi ja Puu, Paper&Timber vol. 74, #6,491–494 no month.
CTAPI, Proceedings of 7th Int. Symp. on Wood and Pulping Chemistry vol. 1 337–347, Beijing, P. R. China, May 25–28, 1993, J. E. Jiang et al. nth.
Extended delignification in kraft cooking through improved selectivity. K. Sjoblom et al., Paperi ja Puu–Paper and Timber 5,452–460, 1988 no month.
Improved modified kraft cooking. B. Mao and N. Hartler, Nordic Pulp and Paper Research Journal, No. 4, 168–173, 1992. no month.
Extended modified cooking of Southern pine with polysulfide:effects on pulp yield..J. E. Jiang, TAPPI, 77(2), 120–124, Feb. 1994.
NSSC recovery process uses direct oxidation. (S. Mizuguichi & T. Naito, Pulp & Paper Canada, 79(8), T251–253, 1978.).

(List continued on next page.)

Primary Examiner—Arun S. Phasge
Attorney, Agent, or Firm—Swabey Ogilvy Renault

[57] ABSTRACT

A process using an electrodialysis system employing cation-selective membranes and anion-selective membranes, particularly monovalent anion-selective membranes is used to separate kraft pulping liquors into two streams; one that is rich in sulphides (to be used in the initial stage of pulping), and another that is poor in sulphides (to be used in the final stage of pulping). By separating pulping liquors in this way, the sulphur balance in the kraft process can be maintained while obtaining the benefits of modified pulping. The same electrodialytic system can be used to separate green and polysulphide liquors into sulphide-rich and sulphide-poor components.

19 Claims, 3 Drawing Sheets

OTHER PUBLICATIONS

Liquor heat treatment & its impact on chemical recovery. (R. Ryham et al. Proceedings of 4th SPCI Int Conf Book1, pp. 266–280, Bologna, IT, May 19–22, 1992).

Chemical recovery technology for future fiber production. DESULPHUR process. (R. Ryham et al. 80th Ann. Mtng. CPPA Tech. Sect. B179–B190, Feb. 1994).

Ion transport through monovalent–anion–permselective membranes (G. Saracco et al. Ind. Eng. Chem. Res. 33, 96–101, 1994) no month.

Novel Application of monovalent–ion–permselective membranes to the recovery treatment . . . Ind. Eng. Chem. Res. 32, 675–662, 1993 G. Saracco et al. no month.

Thinly Resin Coated Cation–Exchange Resin Membrane with Permselectivity Between . . . T. Yawataya et al. Dechema Monogr. 47, 501–514, 1962 no month.

Modification of the Transport Properties of Ion Exchange Membranes. IX. Layer . . . T. Sata et al. J. Membr. Sci. 45, 197–208, 1989 no month.

Modification of the Transport Properties of Ion Exchange Membranes. XII. Ionic . . . T. Sata et al. J. Membr. Sci. 45, 209–224, 1989 no month.

Production of Polysulfide Using a New Catalyst. M. Nakamura et al. Proceedings of the Tappi Pulping Conf. Atalanta 407, 1988 no month.

W. E. Lightfoot, New Catalyst Improves Polysulfide Liquor Makeup, $O_2$ Delignification. Pulp & Paper, 64(1):88, 1990 no month.

SEPARATION OF SULPHIDES FROM PULPING LIQUORS BY ELECTRODIALYSIS

BACKGROUND OF THE INVENTION

1. Field of the Invention

The present invention is concerned with the separation of monovalent anions in a basic medium with respect to their relative basicity.

More especially this invention relates to a process that separates the liquors used in the kraft pulping process into two streams; one stream that is rich in alkali metal sulphide and another that is poor in alkali metal sulphide.

2. Description of Prior Art

The kraft pulping process is the most widely used to produce chemical pulps and as such has been the focus of much research and development. In the production of bleached kraft pulp, a low lignin content is desirable (both after pulping and after oxygen delignification), in order to decrease the consumption of expensive bleaching chemicals and to reduce the effect of bleaching effluents on the environment. Various modifications to the basic kraft pulping method have been suggested. The objective of these modifications has generally been to improve the selectivity of the pulping process. Improving selectivity in a pulping process means that the rate of delignification is high compared to the rate of cellulose and hemicellulose degradation. Two such processes are MCC—modified continuous cooking (B. Johansson et al., Svensk Papperstidning nr 10, 30–35, 1984) and EMCC—extended modified continuous cooking (J. E. Jiang et al., APPITA, 45 (1), 19, 1992). It is recognized that the selectivity of the process could be improved further by applying a high sodium sulphide to sodium hydroxide ratio at the beginning of the delignification phase (S. Nordén and A. Teder, Tappi, 62(7), 49–51, July 1979, A. Teder and L. Olm, Paperi ja Puu 63 (4a), 315–322, 1981, B. Mao and N. Hartler, Paperi ja Puu—Paper and Timber, Vol. 74, No. 6, 491–494, 1992).

In a continuous digester system using MCC or EMCC, it is standard practice to divide the total effective alkali (EA) charge into three or four portions. It is simultaneous control of this EA distribution and the dissolved lignin profile that makes selective extended delignification possible. Dividing the total EA addition into three charges results in a slower pulping rate; this effect can be minimized by adding all of the sodium sulphide to the first EA charge in the impregnation stage. This improvement in pulping seems to be additive to that of modified and extended modified cooking (J. E. Jiang et al., CTAPI, Proceedings of 7th Int. Symp. on Wood and Pulping Chemistry, Vol. 1, 337–347, Beijing, P. R. China, May 25–28, 1993). A low concentration of dissolved lignin and a high alkali concentration in the final delignification phase increases the lignin removal (K. Sjoblom et al., Paperi ja Puu—Paper and Timber, 5, 452–460, 1988, B. Mao and N. Hartler, Nordic Pulp and Paper Research Journal, No. 4, 168–173, 1992). A process that generates a sulphide-rich and a sulphide-poor liquor while maintaining the sulphur balance in the kraft process would help in improving the pulping process.

Extended modified cooking has also been examined in the presence of polysulphide which increases pulp yield. Extended modified cooking and polysulphide pulping are two compatible processes that offer complementary advantages (J. E. Jiang, Tappi, 77(2), 120–124, February 1994). A process that provides a high polysulphide concentration in the presence of a decreased concentration of hydroxide would allow further improvements of the pulping process.

At present, there are three published methods of producing liquors with different sulphidities, although none has been tried on a commercial scale. H. A. Simons Ltd. (P. P. H. Lownertz, World patent, WO92/20856, 26 Nov. 1992) proposed a process in which the sodium sulphide content of recovery boiler smelt is leached with water or sulphide-poor white liquor. The solid sodium carbonate content is separated from the sulphide-rich green liquor and dissolved prior to causticizing. The sodium carbonate solution is causticized to a sulphide-poor white liquor. This sulphide-poor liquor can be used for leaching the smelt, for oxygen delignification and for flue gas scrubbing. The sulphide-rich white liquor can be used in the initial phase as well as at the beginning of the bulk delignification phase of the pulping process. The system used is based on technology developed for neutral sulphite semichemical (NSSC) recovery (S. Mizuguichi and T. Naito, Pulp & Paper Canada, 79(8), T251–253, 1978), but is modified to avoid oxidation of sulphide, and to utilize the heat content of the smelt to evaporate water from the liquor.

Another system proposed by Ahlstrom Corporation is a combination of liquor heat treatment (R. Ryham and S. Nikkanen, Proceedings of the 4th SPCI International Conference: Book 1, pp.266–280, Bologna, Italy, May 19–22, 1992) and the DESULPHUR process (R. Ryham and H. Lindberg, 80th Annual Meeting, CPPA Technical Section, B179–B190, February 1994). The basic step in the DESULPHUR process is heat treatment of black liquor, in a process where up to 50% of the sulphur content in the black liquor is released as methyl mercaptan and dimethyl sulphide. The organic sulphides are then converted to hydrogen sulphide. Scrubbing the hydrogen sulphide gas with white liquor provides a white liquor with high sulphidity. In this way about 75% of the total sulphide charge is concentrated in a stream containing about 60% of the total charge of effective alkali. This composition approximates the chemical requirement in the impregnation stage of modified cooking processes.

White liquor with split sulphidity can also be prepared by crystallizing sodium carbonate from well-purified green liquor, Green Liquor Cooling Crystallization (GLCC), (R. Ryham and H. Lindberg, 80th Annual Meeting, CPPA Technical Section, B179–B190, February 1994). The crystallization is accomplished by simultaneous evaporation and cooling of green liquor to about 12° C. The alkali metal carbonate crystals are separated and dissolved prior to causticizing. In this way it is possible to produce a stream that contains about 60% of the EA charged to the digester. The remaining 40% of the EA will be in a sulphur-free caustic stream. Compared to a normal white liquor having 38% sulphidity, the sulphide-rich white liquor would have a sulphidity of about 62%.

Since white liquor is generated in a largely closed causticizing cycle, the ratio of $Na_2S$ to NaOH remains constant. In order to obtain two streams of white liquor with different concentrations of $Na_2S$ and NaOH, while maintaining the overall sulphidity in the recovery cycle, electrodialysis of white liquor prior to cooking is proposed.

Electrodialytic systems have been generally used for the separation and concentration of electrolytes (H. Hirai, S. Matsushita and I. Tsuyuki, U.S. Pat. No. 4,207,157, Jun. 10, 1980, D. J. Vaughan, U.S. Pat. No. 4,325,792, Apr. 20, 1982). More particularly, they have been used to separate monovalent anions and cations from multivalent anions and cations by incorporating into these systems monovalent anion- and cation-selective membranes. Examples of these applications include the separation of chloride and fluoride ions from a metal sulphate solution (D. L. Ball and D. A. D. Boateng, U.S. Pat. No. 4,715,939, Dec. 29, 1987), the separation of chloride ions from sulphate ions in seawater (G. Saracco and M. C. Zanetti, Ind. Eng. Chem. Res., 33, 96–101, 1994) and the separation of chloride ions from oxalate ions in an industrial waste water from electrolytic production of titanium (G. Saracco, M. C. Zanetti and M. Onofrio, Ind. Eng. Chem. Res., 32, 675–662, 1993). In a recent patent (M. W. Kennedy et al., U.S. Pat. No. 5,324,403, Jun. 28, 1994), electrodialysis is used to separate sulphate and thiosulphate from a hydrogen sulphide scrubber solution of the liquid redox type. There are, however, no published data on the selectivity of anion-selective membranes towards monovalent anions on the basis of their basicity, nor are there any published methods of separating hydrosulphide from kraft mill white liquor (a mixture of sodium sulphide and sodium hydroxide) and from kraft mill green liquor (a mixture of sodium sulphide, sodium carbonate and sodium hydroxide) by electrodialysis.

There are also, no published data on the separation of hydroxide from polysulphide in a Kraft mill polysulphide liquor.

SUMMARY OF INVENTION

It is an object of this invention to provide a process for separation of monovalent anions on the basis of their basicity.

It is also an object of this invention to provide a process for the separation of sulphide from hydroxide in white liquor used in kraft pulping.

It is a further object of this invention to provide a process for the separation of sulphide from carbonate and hydroxide in green liquor. Green liquor is the liquor which upon causticizing yields white liquor.

It is a further object of this invention to provide a process for the separation of chloride from hydroxide and sulphide in white liquor used in Kraft pulping.

It is still a further object of this invention to provide a process for the separation of hydroxide from polysulphide in polysulphide liquor. Polysulphide liquor is a liquor that can be used in the modified kraft pulping process to improve yield.

It is still a further object of this invention to provide such processes employing an electrodialysis system incorporating cation-selective membranes and anion-selective membranes, in particular, monovalent anion-selective membranes.

In accordance with the invention there is provided a process for separating an alkaline aqueous sulphide-containing solution into a sulphide-rich solution and a sulphide-poor solution comprising: i) feeding an aqueous sulphide-containing solution into a diluting compartment of an electrodialysis cell, said diluting compartment being separated from a concentrating compartment by an anion-selective membrane, ii) feeding a liquid comprising water into said concentrating compartment, iii) passing a direct current through the electrodialysis cell to effect transfer of hydrosulphide ions from said diluting compartment to said concentrating compartment, iv) recovering a sulphide-rich solution from said concentrating compartment, and v) recovering a sulphide-poor solution from said diluting compartment.

In accordance with the invention, there is also provided a process for separating an aqueous alkaline chloride-containing solution into a chloride-rich solution and a chloride-poor solution comprising: i) feeding an alkaline chloride-containing solution into a diluting compartment of an electrodialysis cell, said diluting compartment being separated from a concentrating compartment by an anion-selective membrane, ii) feeding a liquid comprising water into said concentrating compartment, iii) passing a direct current through the electrodialysis cell to effect the transfer of chloride ions from said diluting compartments to said concentrating compartments, iv) recovering a chloride-rich solution from said concentrating compartment, and v) recovering a chloride-poor solution from said diluting compartment.

In accordance with the invention, there is also provided a process for separating an aqueous alkaline polysulphide-containing solution into a polysulphide-rich solution and a polysulphide-poor solution comprising: i) feeding an alkaline polysulphide-containing solution into a diluting compartment of an electrodialysis cell, said diluting compartment being separated from a concentrating compartment by an anion-selective membrane, ii) feeding a liquid comprising water into said concentrating compartment, iii) passing a direct current through the electrodialysis cell to effect the transfer of hydroxide ions from said diluting compartments to said concentrating compartments, iv) recovering a hydroxide-rich solution from said concentrating compartment, and v) recovering a polysulphide-rich solution from said diluting compartment.

DESCRIPTION OF THE PREFERRED EMBODIMENTS

The sulphide content of white liquor hydrolyses according to the following reaction:

$$S^{2-}+H_2O \rightleftharpoons HS^-+OH^- \quad (1)$$

Because of the high $pK_a$ of $HS^-$ of 13–16, in the range of pH values encountered in kraft pulping liquors of 12–14, most of the sulphide is in the hydrosulphide ($HS^-$) form.

In accordance with the invention it has been found that alkali metal sulphides can be removed from kraft mill pulping liquors by using a two-compartment electrodialysis system employing alternate cation-selective and anion-selective membranes, particularly monovalent anion-selective membranes.

In accordance with a preferred embodiment of the invention there is provided a process which comprises the steps of: a) providing a cell comprising an anode, a cathode and at least two compartments therebetween defined by spaced apart, alternating cation-selective and anion-selective membranes, a first of said compartments defined between an anion-selective membrane and a first cation-selective membrane, being a diluting compartment, and a second of said compartments defined between said anion-selective membrane and a second cation selective membrane, being a concentrating compartment; said diluting compartment being disposed between said concentrating compartment and said cathode, and said concentrating compartment being disposed between said diluting compartment and said anode; b) feeding white liquor solution into the diluting compartment; c) feeding a liquid comprising water into the concentrating compartment; d) passing a direct current through said cell to effect migration of hydrosulphide ions through said anion-selective membrane from said diluting compartment to said concentrating compartment; e) bleeding from said diluting compartment a white liquor solution depleted in sulphide, and f) bleeding from said concentrating compartment a liquid enriched in sulphide.

In particular, the cell of the invention may comprise a plurality of concentrating compartments and a plurality of diluting compartments, in alternate relationship between the anode and the cathode. In this way the direct current in d) effects migration of cations, more especially alkali metal ions from the diluting compartments, towards the cathode, whereby they are collected and trapped in the concentrating compartments. In this way, the liquid bled from the concentrating compartments is rich in alkali metal sulphide, while the liquid bled from the diluting compartments in depleted in alkali metal sulphide.

Furthermore, in accordance with a preferred embodiment of the invention there is provided a process which comprises the steps of: (a) providing a cell comprising an anode, a cathode and at least two compartments employing alternate cation-selective and anion-selective membranes, particularly monovalent anion-selective membranes (b) feeding a pulping liquor, for example, a white liquor solution into a diluting compartment between a cation-selective membrane and a monovalent anion-selective membrane; (c) feeding a liquid comprising water (which may contain an electrolyte) into each concentrating compartment, between a cation-selective membrane and an anion-selective membrane (or a monovalent anion-selective membrane); (d) passing a direct current through the electrodialysis (ED) system thereby causing the transfer of, for example, alkali metal ions and hydrosulphide ions from the pulping liquor solution in the diluting compartments to the concentrating compartments; (e) bleeding from the diluting compartments in this example a pulping liquor solution that is depleted in alkali metal sulphide; (f) bleeding from the concentrating compartments a liquid that is enriched in alkali metal sulphide.

The present invention contemplates a process which includes the following steps:

(a) Filtering the industrial white liquor to remove suspended particles;

(b) feeding the purified solution of white liquor into an ED system composed of alternating cation-selective, and anion-selective membranes, the solution is introduced into each diluting compartment between a cation-selective membrane and an anion-selective membrane;

(c) feeding a liquid comprising water or dilute alkali metal hydroxide and/or sulphide into each concentrating compartment, between a cation-selective membrane and an anion-selective membrane;

(d) passing a direct current through the ED system thereby causing the transfer of alkali metal ions and hydrosulphide ions from the feed liquor in the diluting compartments to the concentrating compartments;

(e) bleeding from the diluting compartments a solution that is depleted in alkali metal sulphide;

(f) bleeding from the concentrating compartments a liquid enriched in aqueous alkali metal sulphide.

The two-compartment ED system referred to in the process of the invention may be any of the systems described in U.S. Pat. No. 4,715,939, Dec. 29, 1987 by D. L. Ball and D. A. D. Boateng. The two-compartment ED system is composed of a large number of cation-selective and anion-selective membranes alternately stacked between two electrodes.

The cation-selective membranes useful in the process of the present invention can be weakly acidic or strongly acidic cation-selective membranes. Examples of suitable cation-selective membranes are Selemion CMV cation-selective membranes (Trademark—Asahi Glass Co, Tokyo, Japan), but other commercially available cation-selective membranes can be used. In order to minimize the fouling of cation-selective membranes by multivalent cations, monovalent cation-selective membranes (e.g., Selemion CSV, Asahi Glass Co. or Neosepta CMS, Trademark—Tokuyama Soda Co., Tokyo, Japan) can be used; these are prepared by synthesizing a thin positively-charged layer on their surface (T. Yawataya, Dechema Monogr., 47, 501–514, 1962, T. Sata et al., J. Membr. Sci., 45, 197–208, 1989 and T. Sata and R. Izuo, J. Membr. Sci., 45, 209–224, 1989).

The anion-selective membranes useful in the process of the present invention are strongly basic anion-selective membranes such as Neosepta AM-1 (Trademark—Tokuyama Soda) and, in particular, monovalent anion-selective membranes such as the Selemion ASV membrane (Trademark—Asahi Glass Co.) and the Neosepta ACS membranes (Trademark—Tokuyama Soda Co.). The Selemion ASV membrane is composed of a polystyrene matrix with quaternary ammonium groups which provide it with its anion-selective properties. In addition, this membrane incorporates a thin highly cross-linked surface layer composed of both strongly ($—NR_3^+$) and weakly ($—NR_2$) basic anion-exchange groups. The thickness of the highly cross-linked layer is optimized so as to reduce divalent-ion transport without unacceptably increasing the electrical resistance of the membranes. Under neutral or mild pH conditions, monovalent anions such as $Cl^-$ are preferentially passed through the membranes as compared to divalent anions such as $SO_4^{-2}$, based on size exclusion and/or other mechanisms. The Neosepta ACS membrane (Tokuyama Soda Co.) is manufactured in a similar fashion and has similar characteristics to the Selemion ASV membrane.

It has now been found, that anion-selective membranes, particularly monovalent anion-selective membranes, can also separate anions on the basis of their basicity. In particular it has been found that the rate of transport of monovalent anions across these membranes is in decreasing order as follows: $Cl^- > HS^- > OH^-$. It is this selectivity which allows the novel separations which are described herein.

In general, stacks that are suitable for electrodialysis can be used. Such stacks are available commercially from Asahi Glass Co., Tokyo, Japan, Tokuyama Soda Co., Tokyo, Japan; Ionics Inc., Watertown, Mass., USA, and other commercial sources.

The operating temperature of the two-compartment ED system may be any temperature compatible with the membranes and above the freezing and/or precipitation point of the solutions, preferably in the 20°–60° C. temperature range.

The feed into the diluting compartments could be any soluble salt mixture composed of monovalent cations (e.g., the Group Ia alkali metals such as sodium and potassium or the non-metal monovalent cations such as ammonium ions) and monovalent anions (e.g. hydroxide, hydrosulphide and chloride) which may contain polyvalent anions (e.g. sulphate, carbonate, polysulphide, etc.).

The operation of the ED system is further described below in an example where white liquor is considered.

The white liquor solution fed into the diluting compartments of the ED stack is suitably of a median composition of 1.2N sodium sulphide and 2.9N sodium hydroxide but may also be composed of different ratios. These concentrations, however, can be higher or lower without adversely affecting the normal operation of the system. Preferably, the feed solution should be free of large amounts of divalent and/or trivalent cations of elements such as calcium, magnesium, manganese, chromium, nickel and iron whose hydroxides could potentially foul the membranes. The problems arising from such cations, can be minimized by filtering the as-received white liquor solution to eliminate suspended particles. The feed solution is also, preferably, free of organic contaminants such as phenolic-type lignin fragments that could potentially foul the anion-selective membranes. In the case of membrane fouling by organics, periodic reversal of electrical polarity, together with simultaneous switching of flows to the diluting and the concentrating compartments, is recommended.

The liquid fed to the concentrating compartments may be water alone, or may be water containing any electrolyte which is compatible with the first stage of pulping. Preferably, this liquid is neutral or alkaline.

The current passed through the ED system in conventional fashion is direct current of a voltage dictated by the resistance of the membranes and the various solution streams between the two electrodes. Current densities between about 20 and about 70 milliamps per square centimeter are preferred. Higher or lower current densities are contemplated, however, for certain specific applications.

The result of the current flow is electrodialysis to produce a white liquor solution depleted in the sulphide of the alkali metal in the diluting compartments and a liquid mainly comprising alkali metal sulphide in the concentrating compartments. It is contemplated that by adjusting the water feed rates into the concentrating compartments and/or the current density, the product alkali metal sulphide solution can be of any desired concentration as limited by acceptable current efficiencies.

The residence time of the aqueous white liquor solution in the diluting compartments is suitably sufficient to cause sulphidity in this compartment to be reduced to less than about 16%. Suitably, the liquid comprising sodium sulphide and sodium hydroxide withdrawn from the concentrating compartment has a sulphidity as high as 78%.

Representative white liquor compositions in the feed solution are between 0.9N and 1.3N in sodium sulphide, while sodium hydroxide concentrations in these same solutions are 2.6 to 3.9N, although sodium hydroxide concentrations may be as low as 2N in some cases.

BRIEF DESCRIPTION OF THE DRAWINGS

The invention is illustrated in preferred embodiments by reference to the accompanying drawings in which.

DESCRIPTION OF PREFERRED EMBODIMENTS WITH REFERENCE TO THE DRAWINGS

Figure 1:
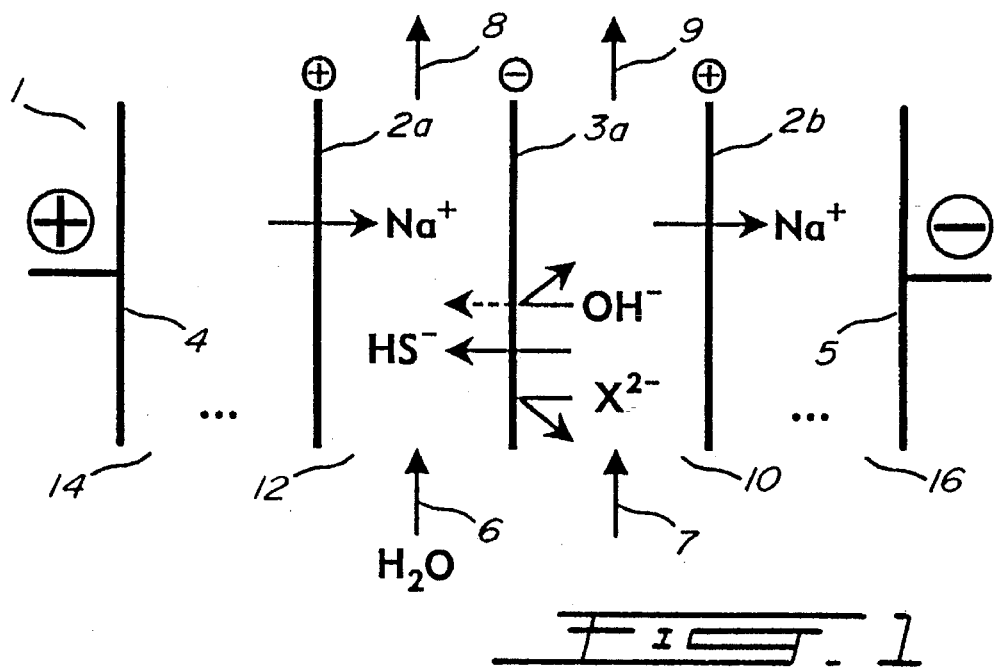
FIG. 1 illustrates schematically a two-compartment ED cell stack of the invention.

FIG. 1 illustrates the process of the invention employing a unit ED cell. An ED cell stack 1 is shown with cation-selective membranes 2a, 2b and monovalent anion-selective membrane 3a, alternately stacked together between an anode 4 and a cathode 5. In FIG. 1 two cation-selective membranes 2a, and 2b and one anion-selective membrane 3a, are shown, however, a much greater number of such units can be incorporated between the two electrodes as suggested by the three dots near each electrode. A minimum of two cation-selective and one anion-selective membranes are needed for a complete unit cell.

In this example a solution of white liquor is fed in stream 7 into the ED cell between the cation-selective membrane 2b and monovalent anion-selective membrane 3a (diluting compartment 10).

The divalent anion $X^{2-}$ in FIG. 1 is, in particular, polysulphide, sulphate, sulphite, thiosulphate, carbonate or mixtures of two or more of these.

Simultaneously, a water stream 6, which may contain an electrolyte (preferably low concentrations of sodium sulphide and/or sodium hydroxide), is fed into the ED cell between the cation-selective membrane 2a and the anion-selective membrane 3a (concentrating compartment 12). An alkaline solution such as sodium hydroxide or a neutral solution such as sodium sulphate is fed to the compartments 14 and 16, adjacent to the anode 4 and cathode 5, respectively, from a reservoir, and returned from compartments 14, 16 to the reservoir, after degassing to remove hydrogen and oxygen.

Current is passed between anode 4 and cathode 5 through the ED cell, causing alkali metal cations to migrate toward the cathode across the cation-selective membranes 2a and 2b, and the monovalent anions such as $HS^-$ and $OH^-$ ions to migrate towards the anode across the monovalent anion-selective membrane 3a. It was found that $HS^-$ passes preferentially through the monovalent anion-selective membrane. Accordingly, mainly alkali metal sulphide is formed in the concentrating compartment 12 between the cation-selective membrane 2a and the anion-selective membrane 3a, and this alkali metal sulphide is bled from the ED cell through stream 8. The diluting compartment 10 between the cation-selective membrane 2b and the adjacent anion-selective membrane 3a will contain mainly sodium hydroxide which is bled through stream 9.

The solution bled from the concentrating compartment may be used in the initial stage of kraft pulping, or may be used to prepare polysulphide liquor of higher concentration than obtained by available methods in the literature, whereby polysulphide liquor is prepared from normal white liquor by using an activated carbon catalyst (M. Nakamura and T. Ono, Proceedings of the Tappi Pulping Conference, Atlanta, 407, 1988 and W. E. Lightfoot, Pulp and Paper, 64(1):88, 1990), or using a lime mud catalyst in the presence of $MnO_2$ (G. M. Dorris, U.S. Pat. No. 5,082,526, Jan. 21, 1992). The solution bled from the diluting compartment can be used in the final stage of pulping as well as, in place of sodium hydroxide, in an oxygen delignification stage, for pH adjustment or flue gas scrubbing.

The electrodialysis cell employed in this process can be operated in a batch or a feed and bleed mode. A batch mode refers to the case in which the same solution is being recirculated continuously through the system thereby allowing the accumulation of product in the concentrating compartments and the depletion of products in the diluting compartments. A feed and bleed mode of operation provides steady-state operation with constant concentration of the required product.

The current passed through the ED cell is a direct current of a voltage dictated by the resistance of the membranes and the various solution streams between the two electrodes. Current densities between 20 to 70 mA/cm$^2$ are preferred.

EXAMPLES

Example 1

This example illustrates the separation of sulphide ions from a laboratory prepared white liquor. An 8-unit cell electrodialysis stack using Asahi Glass Selemion CMV cation-selective membranes and Asahi Glass Selemion ASV anion-selective membranes (91 cm$^2$ effective membrane area) was set up. Nafion 417 (Trademark—E.I. DuPont de Nemours & Co.) cation-selective membranes were used for the rinse compartments. A unit cell is shown in FIG. 1. Throughout the experiment, the circulation tanks of the concentrating and diluting compartments were blanketed with nitrogen gas to minimize the oxidation of sulphide. White liquor of a median composition (e.g., 1.2N Na$_2$S, 2.9N NaOH, sulphidity of 29.5%) was prepared (at 27.8° C.). Other constituents of the white liquor used are given in Table 1. The experiments were run in the batch mode with an initial concentration of 0.25N NaOH (at 28.3° C.) in the concentrating compartment, and simulated white liquor in the diluting compartment. The current densities applied were lower than the limiting current density as determined by polarization curves recorded during the experiment. The standard kraft pulping terms are defined as follows: Active Alkali (AA) is NaOH+Na$_2$S, expressed as g/l Na$_2$O; Total Titratable Alkali (TTA) is NaOH+Na$_2$S+Na$_2$CO$_3$, expressed as g/l Na$_2$O and Sulphidity is the ratio of Na$_2$S to AA in % on Na$_2$O basis. The concentration of NaOH, Na$_2$S and Total Titratable Alkali (TTA) were determined through a potentiometric titration. The reported concentration of NaOH excludes the amount of NaOH produced from the hydrolysis of Na$_2$S.

TABLE 1

Median composition of white liquor

| Component | Concentration, N | Concentration, g/l Na$_2$O | Concentration, Range, g/l Na$_2$O |
|---|---|---|---|
| NaOH | 3.06 | 95 | 81–120 |
| Na$_2$S | 1.22 | 38 | 30–40 |
| Na$_2$CO$_3$ | 0.84 | 26 | 11–44 |
| Na$_2$SO$_3$ | 0.15 | 4.8 | 2–6.9 |
| Na$_2$SO$_4$ | 0.30 | 9.1 | 4.4–18 |
| Na$_2$S$_2$O$_3$ | 0.19 | 6 | 4–8.9 |

A 10% NaOH solution was fed to the compartments adjacent to the anode and the cathode from a reservoir and returned to the reservoir, after degassing to remove hydrogen and oxygen. Each cell compartment was connected to its appropriate reservoir tank and all compartments operated in the batch mode. Table 2 shows the conditions used for the operation of the cell stack.

TABLE 2

| General experimental conditions | | | | |
|---|---|---|---|---|
| | Diluting | | Concentrating | |
| Initial Concentration in Loop, N | NaOH | Na$_2$S | NaOH | Na$_2$S |
| | 2.92 | 1.22 | 0.25 | 0.0 |
| Initial Volume in Loop, L | 7.8 | | 5.7 | |
| Circulation Rate, L/min | 3.9 | | 3 | |
| Hydraulic Pressure, kPa (ga.) | 65 | | 65 | |

Figure 2:
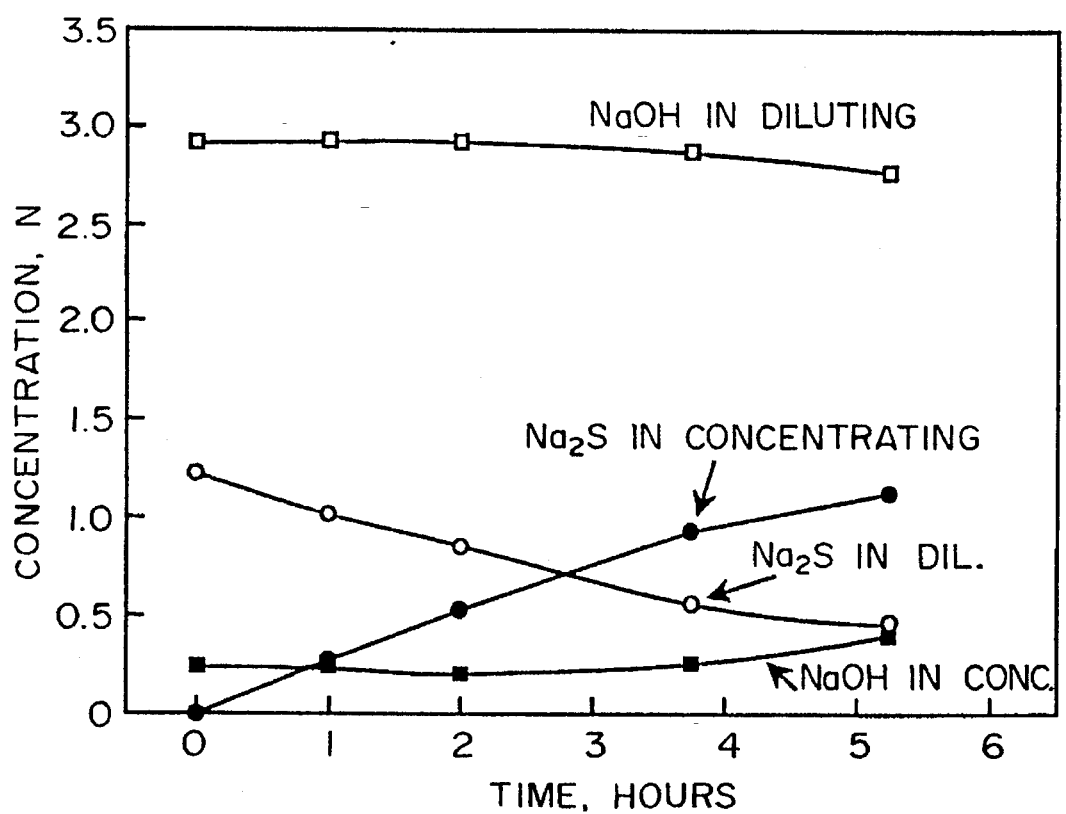
FIG. 2 illustrates the initial changes in the concentration of hydroxide and sulphide with time in a laboratory prepared white liquor processed through the ED system shown in FIG. 1 (Example 1).

In the first 225 minutes (3.75 hours) of operation, the sulphide concentration in the concentrating compartment increased from zero to 0.93N, whereas the hydroxide concentration increased only slightly from 0.25N to 0.26N. In the same time period, the concentration of sulphide in the diluting compartment declined from 1.22N to 0.56N, whereas the hydroxide concentration declined only slightly from 2.92N to 2.88N (FIG. 2). These results show that under the conditions of this experiment, the ASV anion-selective membrane is more selective to hydrosulphide anions than hydroxide anions. The sulphidity was 78.3% in the concentrating compartment, versus 16.3% in the diluting compartment. In order to be consistent with the normal definition of sulphidity and TTA, sulphide ions are represented as Na$_2$S, although it is hydrosulphide ions (HS$^-$) which are crossing through the membrane. The average current efficiencies over a period of 3.75 hours, were 41.7% for total hydroxide (total hydroxide includes the amount produced from the hydrolysis of Na$_2$S) and 41.3% for hydrosulphide.

Potentiometric and conductimetric titrations showed that the concentrating compartment did not contain any carbonate. Chemical analyses for other sodium salts showed that the amount of carbonate, sulphate, sulphite and thiosulphate in the concentrating compartment was insignificant. It appears that these ions do not pass through the membrane because, as a result of the high pH of the solution, they are in their divalent form.

Two polarization curves were recorded during the experiment, and the operating current density was adjusted between 44 to 66 mA/cm$^2$. After 3.75 hours, the cell voltage (excluding the electrode compartments) was 0.57 V per unit cell, at 6A and 29.3° C.

On the basis of the data obtained in this experiment, it is possible to operate the system under steady-state condition to produce a white liquor of high sulphidity (78%). Depending on the pulping requirement, white liquor of lower sulphidity can be obtained. The feed rate of water to the concentrating compartment can be adjusted in order to obtain the desired concentration of sulphide while maintaining the ratio of sulphide/hydroxide at the required level.

Example 2

In order to evaluate other membranes, the Selemion ASV membranes used in the ED cell stack were replaced by Tokuyama monovalent anion-selective membranes (Neosepta ACS). The initial concentration of white liquor in the diluting compartment was 1.08N Na$_2$S and 2.8N NaOH, sulphidity of 28.1%. The initial concentration of NaOH in the concentrating compartment was 0.32N. Over a period of 4 hours, the diluting compartment had a concentration of 0.57N Na$_2$S and 2.5N NaOH (sulphidity of 19%). The current density was adjusted to be 44 to 66 mA/cm$^2$. The concentrating compartment had a concentration of 1N Na$_2$S and 0.35N NaOH (sulphidity of 73.8%). The average current efficiencies were 26% for total hydroxide and 33.2% for hydrosulphide. The carbonate content of the white liquor remained mainly unchanged in the diluting compartment. Table 3 shows the molar ratios of hydrosulphide/hydroxide in the concentrating compartments in Examples 1 and 2. It appears that the Neosepta ACS is more selective towards hydrosulphide ions as compared to the Selemion ASV.

TABLE 3

The molar ratio of hydrosulphide to hydroxide in the concentrating compartment

| Time, hours | Selemion ASV NaHS/NaOH | Neosepta ACS NaHS/NaOH |
|---|---|---|
| 0 | 0 | 0 |
| 1 | 1.09 | 2.33 |
| 2 | 1.24 | 1.95 |
| 3 | — | 1.60 |
| 3.75 | 0.99 | — |
| 4 | — | 1.28 |

Example 3

To examine the selectivity of the general purpose anion-selective membranes, as compared to monovalent anion-selective membranes, the monovalent anion-selective membranes used in the ED cell stack were replaced by a strongly basic, anion-selective membrane (Neosepta AM-1, Tokuyama Soda Co.). A white liquor of similar composition (1.1N $Na_2S$ and 3.1N NaOH, sulphidity of 26.2%) was placed in the diluting compartment and a 0.3N NaOH solution was placed in the concentrating compartment. The current density was adjusted to be 44 to 66 $mA/cm^2$. Over a period of 4 hours, the diluting compartment had a concentration of 0.66N $Na_2S$ and 2.9N NaOH (sulphidity of 18.5%). The concentrating compartment had a concentration of 0.74N $Na_2S$ and 0.53N NaOH (sulphidity of 58.3%). The average current efficiencies were 60% for total hydroxide and 37.2% for hydrosulphide. The carbonate content of the white liquor remained unchanged in the diluting compartment. Table 4 shows the molar ratio of hydrosulphide/hydroxide in the concentrating compartments in Examples 2 and 3. It appears that the monovalent anion-selective membrane (Neosepta ACS) is more selective to hydrosulphide ions than the general purpose anion-selective membrane (Neosepta AM-1).

TABLE 4

The molar ratio of hydrosulphide to hydroxide in the concentrating compartment

| Time, hours | Neosepta ACS NaHS/NaOH | Neosepta AM-1 NaHS/NaOH |
|---|---|---|
| 0 | 0 | 0 |
| 1 | 2.33 | 0.94 |
| 2 | 1.95 | 0.75 |
| 3 | 1.60 | 0.73 |
| 4 | 1.28 | 0.62 |

Example 4

This example illustrates the separation of sulphide ions from a white liquor obtained from a mill. The mill white liquor containing 2.14N NaOH and 1.02N $Na_2S$ was filtered and then processed through the ED stack used for example 1. Because of some residual water in the system, the concentrations dropped to 1.83N NaOH and 0.95N $Na_2S$ (sulphidity of 34.2%). A solution of 0.24N $Na_2S$ was fed into the concentrating compartment. The experimental conditions are given in Table 5.

TABLE 5

Experimental Conditions Used for Example 4

|  | Diluting | | Concentrating | |
|---|---|---|---|---|
|  | NaOH | $Na_2S$ | NaOH | $Na_2S$ |
| Initial Concentration in Loop, N | 1.83 | 0.95 | 0.0 | 0.24 |
| Initial Volume in Loop, L | 8.3 | | 6 | |
| Circulation Rate, L/min | 2.2 | | 3.3 | |
| Hydraulic Pressure, kPa (ga.) | 65 | | 65 | |

After 5.6 hours, the concentration of NaOH and $Na_2S$ in the concentrating compartment rose to 0.21N and 1.08N respectively (sulphidity of 83.7%). At the same time, the sulphidity of white liquor in the diluting compartment declined to 16.4% (1.79N NaOH and 0.35N $Na_2S$). The current density was adjusted to be 22 to 66 $mA/cm^2$. The average current efficiencies were 41.4% for total hydroxide and 27.4% for hydrosulphide. These results are in agreement with the data obtained in Example 1.

Example 5

This example illustrates the separation of chloride from a mill white liquor. A mill liquor of similar composition to Example 4 (1.76N NaOH, 0.9N $Na_2S$) and 33.9% sulphidity) was chosen for this experiment. To examine the degree of separation of chloride from a chloride-rich white liquor, 67 g/L of NaCl was added to the test liquor. A solution of 0.27N $Na_2S$ was fed to the concentrating compartment. The experimental conditions are shown in Table 6.

TABLE 6

Experimental Conditions Used for Example 5

|  | Diluting | | | Concentrating | | |
|---|---|---|---|---|---|---|
|  | NaOH | $Na_2S$ | NaCl | NaOH | $Na_2S$ | NaCl |
| Initial Concentration in Loop, N | 1.76 | 0.90 | 1.15 | 0.0 | 0.27 | 0.0 |
| Initial Volume in Loop, L | | 7.4 | | | 5.5 | |
| Circulation Rate, L/min | | 2.4 | | | 3.2 | |
| Hydraulic Pressure, kPa (ga.) | | 65 | | | 65 | |

Figure 3:
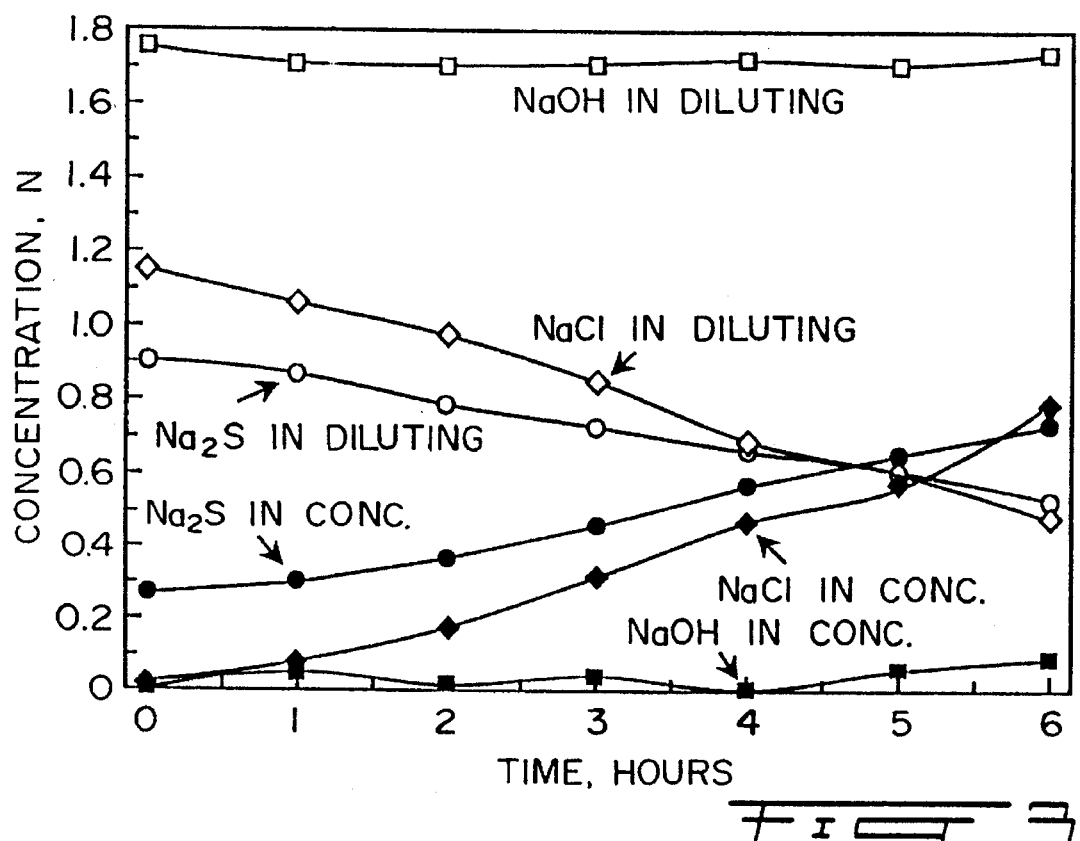
FIG. 3 illustrates the changes in the concentration of hydroxide, sulphide and chloride with time in a mill white liquor spiked with sodium chloride and processed through the ED system shown in FIG. 1 (Example 5).

During a 6-hour run, the sulphidity of white liquor dropped to 23.2% and the chloride level decreased from 1.15N (67 g/L) to 0.48N (28.2 g/L, i.e., 58% removal). The liquor from the concentrating compartment had a sulphidity of 89% and a chloride content of 0.79N (46 g/L); the concentrations of NaOH and $Na_2S$ in this compartment were 0.09N and 0.74N, respectively. The current density was adjusted to be 22 to 66 $mA/cm^2$. The average current efficiencies were 18.2% for total hydroxide, 12.9% for hydrosulphide and 44.7% for chloride. The changes in concentrations versus time are shown in FIG. 3. It appears that the transfer rate increases with decreasing basicity of the ion transferred, i.e., the rate of tranfer is in the order of $Cl^->HS^->OH^-$.

This experiment demonstrated that this particular membrane configuration can be used to decrease the sulphidity and the chloride level of white liquor. This configuration can be particularly useful to coastal and/or closed cycle mills in which chloride accumulates in the liquor cycle. The starting solution in the concentrating compartment can be sodium chloride; in such a case, the solution discarded from the concentrating compartment would be mainly sodium chloride. Depending on the chloride and sulphidity requirements of the white liquor, varying ratios of $Na_2S$ to NaCl can be produced. The liquor obtained from the diluting compartment can either be used directly in conventional cooking, or can be further processed to produce two streams of high sulphidity and high alkalinity liquors.

Example 6

This experiment illustrates that sulphide ions can be separated from a laboratory prepared green liquor. Green liquor of a median composition (e.g., 0.40N NaOH, 1.07N $Na_2S$ and 2.8N $Na_2CO_3$) was prepared. Other constituents of the green liquor used are given in Table 7. The cell stack used was identical to the one used in Example 1. The experiments were run in the batch mode with an initial concentration of 0.12N $Na_2S$ in the concentrating compartment, and simulated green liquor in the diluting compartment. The current density was adjusted to be 22 to 66 mA/cm$^2$. The concentration of NaOH, $Na_2S$ and Total Titratable Alkali (TTA=NaOH+$Na_2S$+$Na_2CO_3$) were determined through a potentiometric titration. The difference between TTA and Active Alkali (AA=NaOH+$Na_2S$), is assumed to be alkali-metal carbonate. The experimental conditions are given in Table 8.

TABLE 7

Median composition of green liquor

| Component | Concentration, N | Concentration, g/l $Na_2O$ | Concentration, Range, g/l $Na_2O$ |
|---|---|---|---|
| NaOH | 0.48 | 15 | 10–18 |
| $Na_2S$ | 1.19 | 37 | 35–40 |
| $Na_2CO_3$ | 3.44 | 107 | 78–135 |
| $Na_2SO_3$ | 0.19 | 6.1 | 4.2–7.6 |
| $Na_2SO_4$ | 0.35 | 11 | 7.4–24 |
| $Na_2S_2O_3$ | 0.18 | 5.5 | 4.3–6.5 |

TABLE 8

Experimental Conditions Used for Example 6

| | Diluting | | | Concentrating | | |
|---|---|---|---|---|---|---|
| | NaOH | $Na_2S$ | $Na_2CO_3$ | NaOH | $Na_2S$ | $Na_2CO_3$ |
| Initial Concentration in Loop, N | 0.40 | 1.07 | 2.8 | 0.0 | 0.12 | 0.0 |
| Initial Volume in Loop, L | | 7.1 | | | 6.6 | |
| Circulation Rate, L/min | | 2.4 | | | 3.2 | |
| Hydraulic Pressure, kPa (ga.) | | 63 | | | 63 | |

Figure 4:
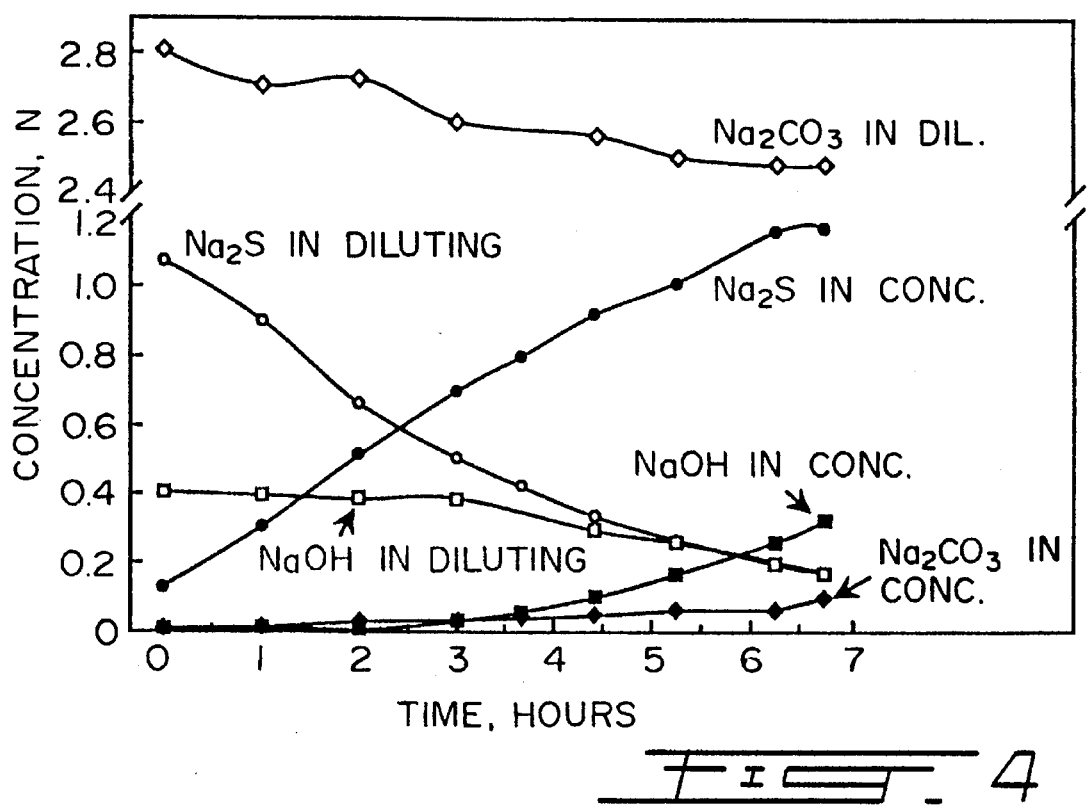
FIG. 4 illustrates the changes in the concentration of hydroxide, sulphide and carbonate with time in a laboratory prepared green liquor processed through the ED system shown in FIG. 1 (Example 6).

After three hours, the concentrations of NaOH, $Na_2S$ and $Na_2CO_3$ in the concentrating compartment were 0.027N, 0.70N and 0.02N respectively (sulphidity of 96.2%). At the same time, the concentrations of NaOH, $Na_2S$ and $Na_2CO_3$ in the diluting compartment were 0.38N, 0.50N and 2.6N respectively (sulphidity of 56.8%). The current efficiencies were 9% for hydroxide and 54.2% for sulphide. The changes in concentrations versus time are shown in FIG. 4.

This experiment demonstrates that green liquor can be separated into a sulphide-rich liquor (concentrating compartment) and a sulphide-poor liquor (diluting compartment). The sulphide-rich liquor can be used in the initial stage of pulping, or it can be used to make polysulphide liquor. The sulphide-poor liquor can be causticized (at higher efficiency) to a caustic-rich white liquor, which can be used in the final stage of pulping.

Example 7

This experiment illustrates that polysulphide liquor can be separated into a polysulphide-rich and a caustic-rich component. A laboratory made polysulphide liquor was prepared by dissolving elemental sulphur in a mixture of sodium sulphide and sodium hydroxide. The chemical composition of the prepared liquor is given in Table 9. The cell stack used was identical to the one used in Example 1. The experiments were run in the batch mode with an initial concentration of 0.26N NaOH in the concentrating compartment, and simulated polysulphide liquor in the diluting compartment. The current density was adjusted to be 44 to 66 mA/cm$^2$. The concentration of polysulphide (PS), expressed as sulphur (S) concentration was measured by a gravimetric method. A known volume of polysulphide liquor was acidified with hydrochloric acid (pH=5–5.5). The precipitated sulphur was then filtered, dried and weighed to determine the amount of polysulphide sulphur. The concentration of NaOH, $Na_2S$ and Total Titratable Alkali (TTA=NaOH+$Na_2S$+$Na_2CO_3$) were determined through a potentiometric titration. The difference between TTA and Active Alkali (AA=NaOH+$Na_2S$), is assumed to be alkali-metal carbonate. The experimental conditions are given in Table 10.

TABLE 9

Composition of the laboratory made polysulphide liquor

| Component | Concentration, N | Concentration, g/l $Na_2O$ |
|---|---|---|
| NaOH | 2.53 | 78.4 |
| $Na_2S$ | 0.46 | 14.3 |
| $Na_2CO_3$ | 0.13 | 4 |
| $Na_2S_2O_3$ | 0.08 | 4.8 |
| PS as S, g/l | 10.1 | — |

TABLE 10

Experimental Conditions Used for Example 7

| | Diluting | | | | Concentrating | | | |
|---|---|---|---|---|---|---|---|---|
| | NaOH | $Na_2S$ | $Na_2CO_3$ | S, g/l | NaOH | $Na_2S$ | $Na_2CO_3$ | S, g/l |
| Initial Concentration in Loop, N | 2.53 | 0.46 | 0.13 | 10.1 | 0.26 | 0.0 | 0.0 | 0.0 |

TABLE 10-continued

| | Experimental Conditions Used for Example 7 | |
| --- | --- | --- |
| | Diluting | Concentrating |
| Initial Volume in Loop, L | 7.7 | 6.2 |
| Circulation Rate, L/min | 2.3 | 3.4 |
| Hydraulic Pressure, kPa (ga.) | 62 | 62 |

Figure 5:
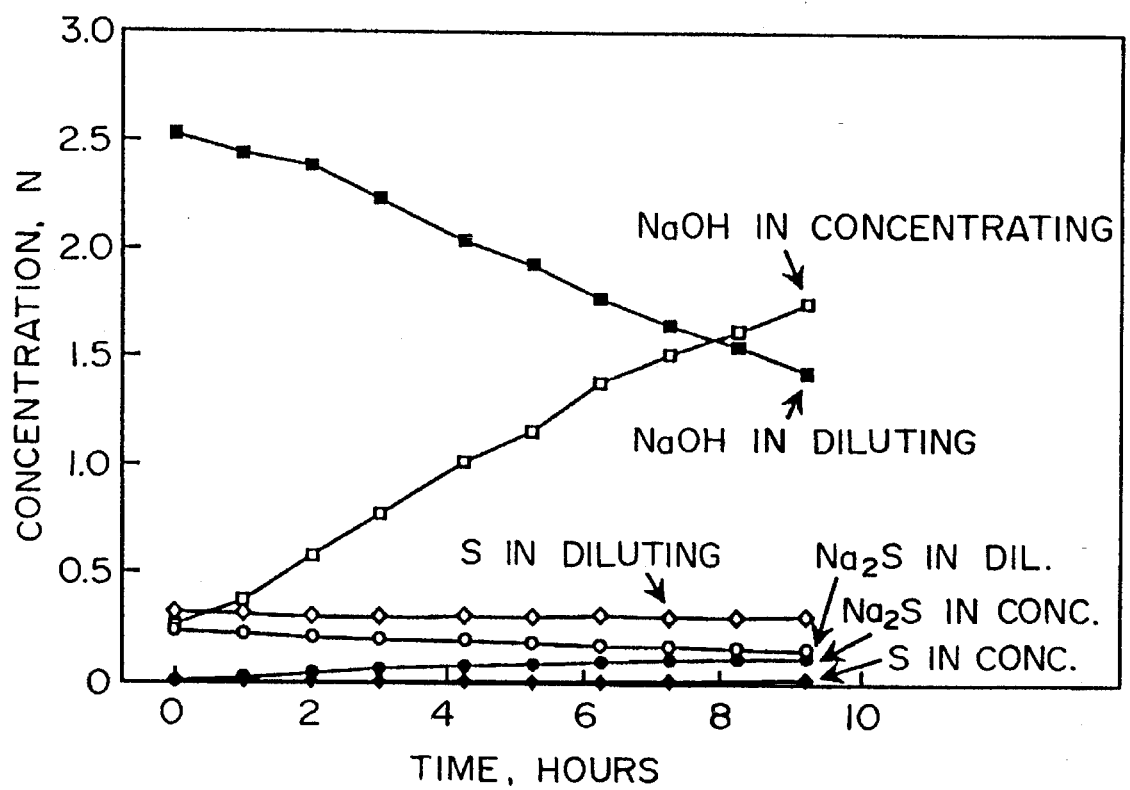
FIG. 5 illustrates the changes in the concentration of hydroxide, sulphide and polysulphide with time in a laboratory prepared polysulphide liquor processed through the ED system shown in FIG. 1 (Example 7).

After 6.25 hours, the concentrations of NaOH, Na$_2$S and PS sulphur in the concentrating compartment were 1.39N, 0.2N and 0.24 g/l respectively (sulphidity of 12.5%). At the same time, the concentrations of NaOH, Na$_2$S and PS sulphur in the diluting compartment were 1.77N, 0.33N and 9.7 g/l respectively (sulphidity of 15.8%). The current efficiencies were 88.5% for hydroxide and 9.7% for sulphide. The changes in concentrations versus time are shown in FIG. 5.

This experiment demonstrates that polysulphide liquor can be separated into a polysulphide-rich liquor (diluting compartment) and a polysulphide-poor liquor (concentrating compartment). The polysulphide-rich liquor can be used in the initial stage of pulping, whereas the polysulphide-poor liquor (caustic-rich) can be used in the final stage of pulping.

The sulphur in polysulphide liquor is in the form of S$_n$S$^{-2}$, where n=1 to 4. The relatively large and mainly divalent polysulphide ions would, therefore, stay in the diluting compartment. The competition is mainly between the OH$^-$ and HS$^-$ ions. Although the HS$^-$ ions preferentially cross the membrane initially, because of their low concentration in the polysulphide liquor (less than half the concentration in a typical white or green liquor), it is hydroxide ions that end up being concentrated in the concentrating equipment.

We claim:

1. A process for separating an alkaline aqueous sulphide-containing kraft pulping solution into a sulphide-rich solution and a sulphide-poor solution comprising:

i) feeding an aqueous sulphide-containing kraft pulping solution containing hydroxide ions, alkali metal ions and sulphide as hydrosulphide ions into a diluting compartment of a two compartment unit electrodialysis cell, said two compartment unit comprising said diluting compartment and a concentrating compartment, said diluting compartment being separated from said concentrating compartment by a monovalent anion-selective membrane, ii) feeding a liquid comprising water into said concentrating compartment, iii) passing a direct current through the electrodialysis cell to effect transfer of said hydrosulphide and alkali metal ions from said diluting compartment to said concentrating compartment, and iv) recovering a sulphide-rich solution from said concentrating compartment.

2. A process according to claim 1, wherein said aqueous sulphide-containing kraft pulping solution in i) is white liquor from a kraft pulp mill.

3. A process according to claim 2, wherein said white liquor is between 0.9N and 1.3N in sodium sulphide and 2.6 to 3.9N in sodium hydroxide.

4. A process according to claim 3, carried out at a temperature of 20° C. to 60° C. and wherein said direct current in iii) has a current density of 20 to 70 mA/cm$^2$.

5. A process according to claim 4, including v) recovering a sulphide-poor, hydroxide rich solution from said diluting compartment.

6. A process according to claim 5, wherein said electrodialysis cell comprises an electrodialysis stack having a plurality of the two compartment units, diluting compartments and concentrating compartments of the units being in alternate relationship in said stack.

7. A process according to claim 5, in which said sulphide-rich solution from step iv) is fed to an initial stage of a kraft pulping process and said hydroxide rich solution from step v) is fed to a final stage of kraft pulping.

8. A process according to claim 1, wherein said aqueous sulphide-containing kraft pulping solution in i) is green liquor from a kraft pulp mill.

9. A process which comprises the steps of:

a) providing a cell comprising an anode, a cathode and at least one two compartment unit therebetween defined by spaced apart, alternating cation-selective and monovalent anion-selective membranes, a first compartment of said unit, defined between a monovalent anion-selective membrane and a first cation-selective membrane, being a diluting compartment, and a second compartment of said unit, defined between said monovalent anion-selective membrane and a second cation selective membrane, being a concentrating compartment; said diluting compartment being disposed between said concentrating compartment and said cathode, and said concentrating compartment being disposed between said diluting compartment and said anode, b) feeding a white liquor solution into the diluting compartment, said white liquor solution containing hydroxide ions, alkali metal ions and sulphide as hydrosulphide ions, c) feeding a liquid comprising water into the concentrating compartment, d) passing a direct current through said cell to effect migration of said hydrosulphide ions through said monovalent anion-selective membrane and said alkali metal ions through said cation-selective membrane, from said diluting compartment to said concentrating compartment;

e) bleeding from said diluting compartment a white liquor solution depleted in alkali metal sulphide and rich in alkali metal hydroxide, and f) bleeding from said concentrating compartment a liquid enriched in alkali metal sulphide.

10. A process according to claim 9, wherein said cell comprises a plurality of said two compartment units, concentrating compartments and diluting compartments of the units being in alternating relationship between said anode and said cathode.

11. A process according to claim 9, wherein said liquid in c) contains an electrolyte.

12. A process according to claim 9, wherein said white liquor is filtered to remove suspended particles prior to entering the diluting compartment.

13. A process according to claim 9, in which said liquid from step f) is fed to an initial stage of a kraft pulping process.

14. A process according to claim 13, in which said solution from step e) is fed to a final stage of a kraft pulping process.

15. A process for separating an aqueous alkaline sulphide and chloride-containing kraft pulping solution into a chloride-rich solution and a chloride-poor solution comprising:

i) feeding an alkaline sulphide and chloride-containing solution containing chloride ions, hydroxide ions and sulphide as hydrosulphide ions into a diluting compartment of a two compartment unit electrodialysis cell, said two compartment unit comprising said diluting compartment and a concentrating compartment, said diluting compartment being separated from said concentrating compartment by an anion-selective membrane, said concentrating compartment being defined between said anion-selective membrane and a cation-selective membrane, ii) feeding a liquid comprising water into said concentrating compartment, iii) passing a direct current through the electrodialysis cell to effect the transfer of chloride ions, in the presence of hydrosulphide ions and hydroxide ions, from said diluting compartment to said concentrating compartment, iv) recovering a chloride-rich solution from said concentrating compartment, and v) recovering a chloride-poor solution from said diluting compartment.

16. A process according to claim 15, wherein said anion-selective membrane is a monovalent anion-selective membrane.

17. A process according to claim 16, wherein said aqueous sulphide and chloride-containing kraft pulping solution in i) is white or green liquor from a kraft pulp mill.

18. A process for separating an aqueous alkaline polysulphide-containing kraft pulping solution into a polysulphide-rich solution and a polysulphide-poor solution comprising:

i) feeding an alkaline polysulphide-containing solution containing hydroxide ions, hydrosulphide ions and polysulphide ions into a diluting compartment of a two compartment unit electrodialysis cell, said two compartment unit comprising said diluting compartment and a concentrating compartment, said diluting compartment being separated from said concentrating compartment by an anion-selective membrane, ii) feeding a liquid comprising water into said concentrating compartment, iii) passing a direct current through the electrodialysis cell to effect the transfer of hydroxide ions from said diluting compartment to said concentrating compartment, iv) recovering a hydroxide-rich solution from said concentrating compartment, and v) recovering a polysulphide-rich solution from said diluting compartment.

19. A process according to claim 18, wherein said anion-selective membrane is a monovalent anion-selective membrane.

* * * * *